US 12,414,041 B2

(12) United States Patent
Li et al.

(10) Patent No.: US 12,414,041 B2
(45) Date of Patent: Sep. 9, 2025

(54) SIDELINK BANDWIDTH PART TIMER BASED ON ACTIVE STATE

(71) Applicant: QUALCOMM Incorporated, San Diego, CA (US)

(72) Inventors: Qing Li, Princeton Junction, NJ (US); Hong Cheng, Basking Ridge, NJ (US); Junyi Li, Fairless Hills, PA (US)

(73) Assignee: Qualcomm Incorporated, San Diego, CA (US)

( * ) Notice: Subject to any disclaimer, the term of this patent is extended or adjusted under 35 U.S.C. 154(b) by 588 days.

(21) Appl. No.: 17/452,809

(22) Filed: Oct. 29, 2021

(65) Prior Publication Data

US 2023/0136275 A1    May 4, 2023

(51) Int. Cl.
| | |
|---|---|
| *H04W 52/02* | (2009.01) |
| *H04L 1/1812* | (2023.01) |
| *H04L 5/00* | (2006.01) |
| *H04W 72/044* | (2023.01) |
| *H04W 72/20* | (2023.01) |

(52) U.S. Cl.
CPC ....... *H04W 52/0232* (2013.01); *H04L 1/1812* (2013.01); *H04L 5/0098* (2013.01); *H04W 72/044* (2013.01); *H04W 72/20* (2023.01)

(58) Field of Classification Search
None
See application file for complete search history.

(56) References Cited

U.S. PATENT DOCUMENTS

| | | | | |
|---|---|---|---|---|
| 2019/0103954 A1* | 4/2019 | Lee | ........................ | H04L 5/0098 |
| 2019/0158229 A1 | 5/2019 | Wei et al. | | |
| 2020/0351067 A1* | 11/2020 | Hui | ........................ | H04L 5/001 |
| 2021/0059005 A1 | 2/2021 | Hosseini et al. | | |
| 2021/0212099 A1* | 7/2021 | Yi | ........................ | H04W 72/23 |
| 2021/0227604 A1 | 7/2021 | Huang et al. | | |
| 2022/0022280 A1* | 1/2022 | Yu | ........................ | H04L 1/1819 |
| 2023/0156602 A1* | 5/2023 | Park | ........................ | H04L 1/1825 370/311 |
| 2023/0209535 A1* | 6/2023 | Park | ........................ | H04W 72/23 370/329 |
| 2023/0337140 A1* | 10/2023 | Miao | ................. | H04W 52/0274 |
| 2023/0397295 A1* | 12/2023 | Salim | ................. | H04W 52/0216 |
| 2024/0172235 A1* | 5/2024 | Pan | ........................ | H04W 72/02 |
| 2024/0172325 A1* | 5/2024 | Adjakple | .............. | H04W 88/02 |
| 2024/0381390 A1* | 11/2024 | Park | ........................ | H04W 4/40 |

FOREIGN PATENT DOCUMENTS

WO    WO-2020198594 A1    10/2020

OTHER PUBLICATIONS

International Search Report and Written Opinion—PCT/US2022/077468—ISA/EPO—Jan. 23, 2023.

* cited by examiner

*Primary Examiner* — Saumit Shah
(74) *Attorney, Agent, or Firm* — Harrity & Harrity LLP

(57) ABSTRACT

Various aspects of the present disclosure generally relate to wireless communication. In some aspects, a first user equipment (UE) may start a sidelink bandwidth part (BWP) timer with a duration that is based at least in part on a timing of a sidelink discontinuous reception active state of the first UE. The first UE may switch to a first sidelink BWP for the duration of the sidelink BWP timer. Numerous other aspects are described.

30 Claims, 11 Drawing Sheets

1000

1010 — Start a sidelink bandwidth part (BWP) timer with a duration that is based at least in part on a timing of a sidelink discontinuous reception (DRX) active state of the first UE 1020 — Switch to a first sidelink BWP for the duration of the sidelink BWP timer

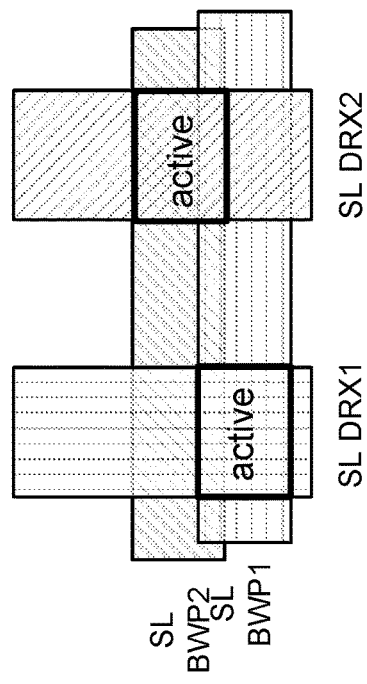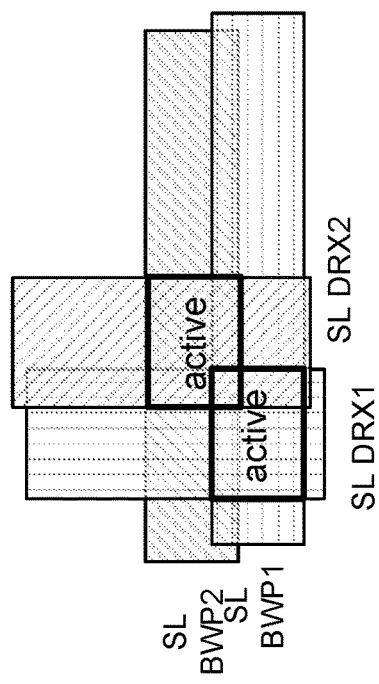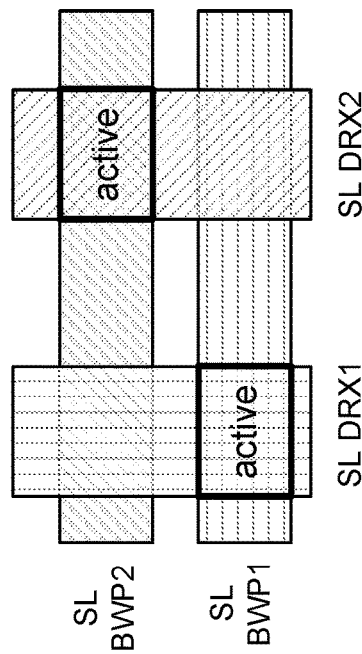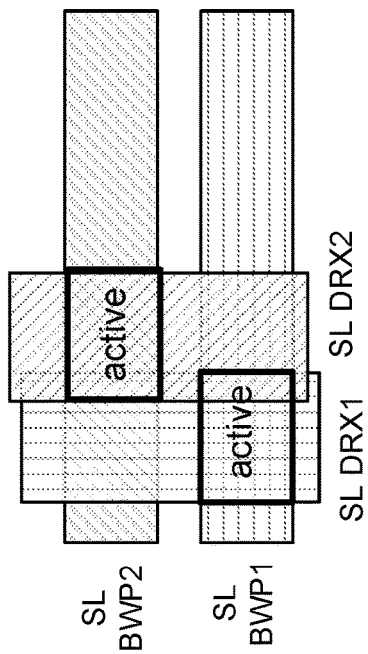
FIG. 5

SIDELINK BANDWIDTH PART TIMER BASED ON ACTIVE STATE

FIELD OF THE DISCLOSURE

Aspects of the present disclosure generally relate to wireless communication and to techniques and apparatuses for using a sidelink bandwidth part timer that is based on an active state.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first user equipment (UE). The method may include starting a sidelink bandwidth part (BWP) timer with a duration that is based at least in part on a timing of a sidelink discontinuous reception (DRX) active state of the first UE. The method may include switching to a first sidelink BWP for the duration of the sidelink BWP timer.

Some aspects described herein relate to a first UE for wireless communication. The first UE may include a memory and one or more processors coupled to the memory. The one or more processors may be configured to start a sidelink BWP timer with a duration that is based at least in part on a timing of a sidelink DRX active state of the first UE. The one or more processors may be configured to switch to a first sidelink BWP for the duration of the sidelink BWP timer.

Some aspects described herein relate to a non-transitory computer-readable medium that stores a set of instructions for wireless communication by a first UE. The set of instructions, when executed by one or more processors of the first UE, may cause the first UE to start a sidelink BWP timer with a duration that is based at least in part on a timing of a sidelink DRX active state of the first UE. The set of instructions, when executed by one or more processors of the UE, may cause the first UE to switch to a first sidelink BWP for the duration of the sidelink BWP timer.

Some aspects described herein relate to an apparatus for wireless communication. The apparatus may include means for starting a sidelink BWP timer with a duration that is based at least in part on a timing of a sidelink DRX active state of the apparatus. The apparatus may include means for switching to a first sidelink BWP for the duration of the sidelink BWP timer.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example of sidelink bandwidth parts (BWPs), in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
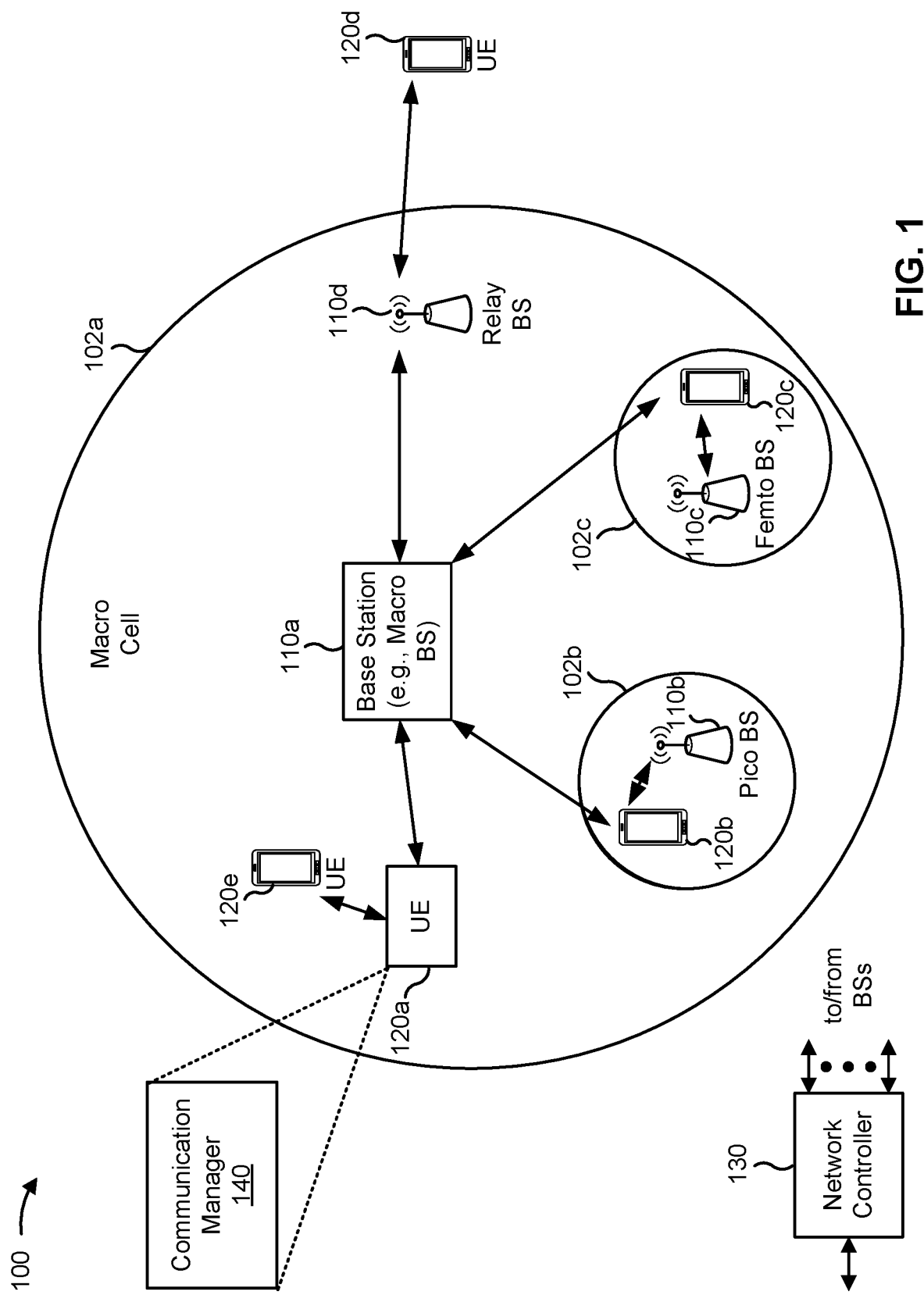
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may start a sidelink bandwidth part (BWP) timer with a duration that is based at least in part on a timing of a sidelink discontinuous reception (DRX) active state of the first UE. The communication manager 140 may switch to a first sidelink BWP for the duration of the sidelink BWP timer. Additionally, or alternatively, the communication manager 140 may perform one or more other operations described herein.

As indicated above, FIG. 1 is provided as an example. Other examples may differ from what is described with regard to FIG. 1.

Figure 2:
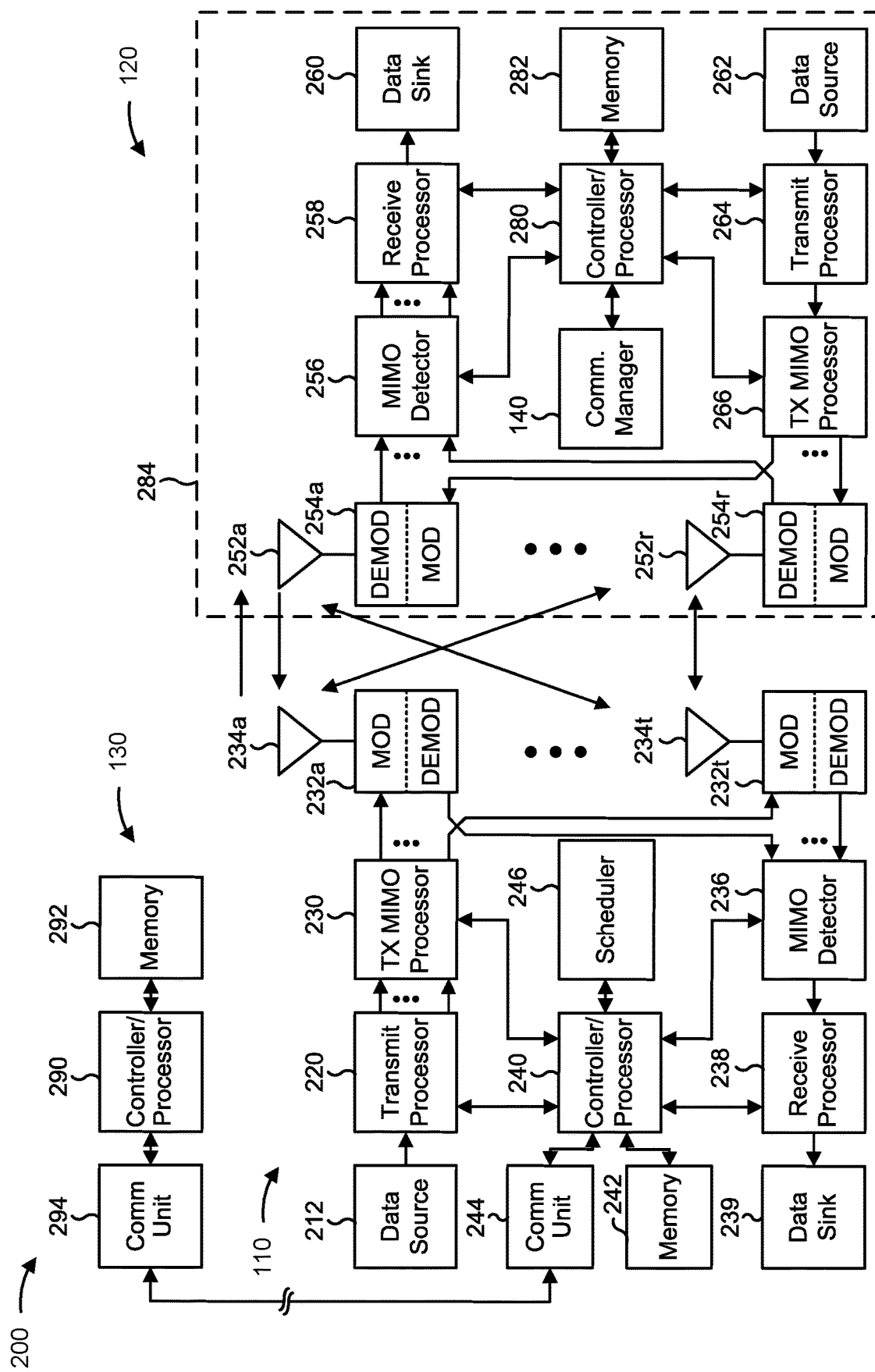
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-11).

The controller/processor 240 of the base station 110, the controller/processor 280 of the UE 120, and/or any other component(s) of FIG. 2 may perform one or more techniques associated with using a sidelink BWP timer that is based on an active state of the UE 120, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, and/or other processes as described herein. In some examples, executing instructions may include running the instructions, converting the instructions, compiling the instructions, and/or interpreting the instructions, among other examples.

In some aspects, a first UE (e.g., UE 120) includes means for starting a sidelink BWP timer with a duration that is based at least in part on a timing of a sidelink DRX active state of the first UE; and/or means for switching to a first sidelink BWP for the duration of the sidelink BWP timer. The means for the first UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
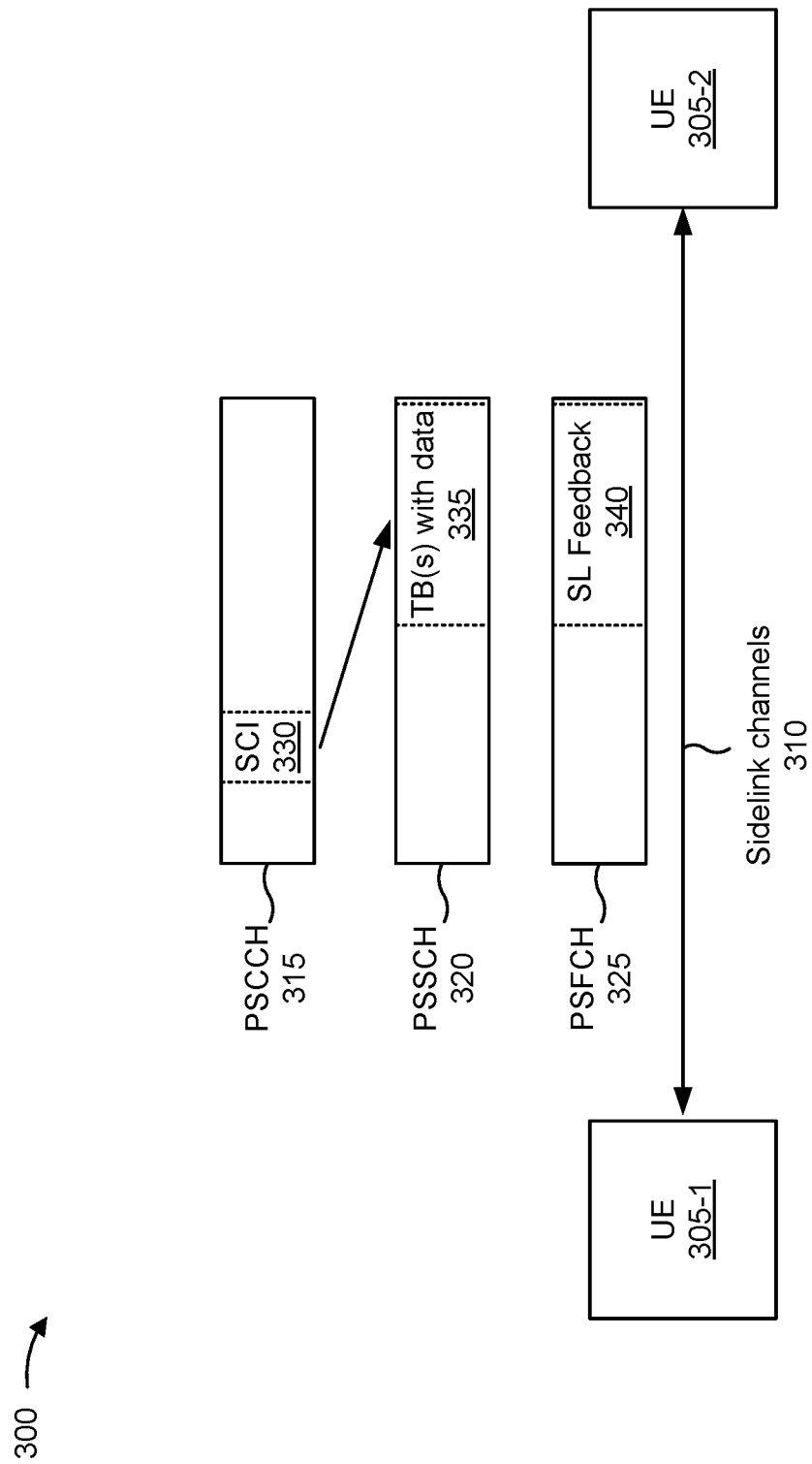
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 320, such as a hybrid automatic repeat request (HARM) process identifier (ID), a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a base station 110. For example, the UE 305 may receive a grant (e.g., in downlink control information (DCI) or in a radio resource control (RRC) message, such as for configured grants) from the base station 110 for sidelink channel access and/or scheduling. In some aspects, a UE 305 may operate using a transmission mode (e.g., Mode 2) where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
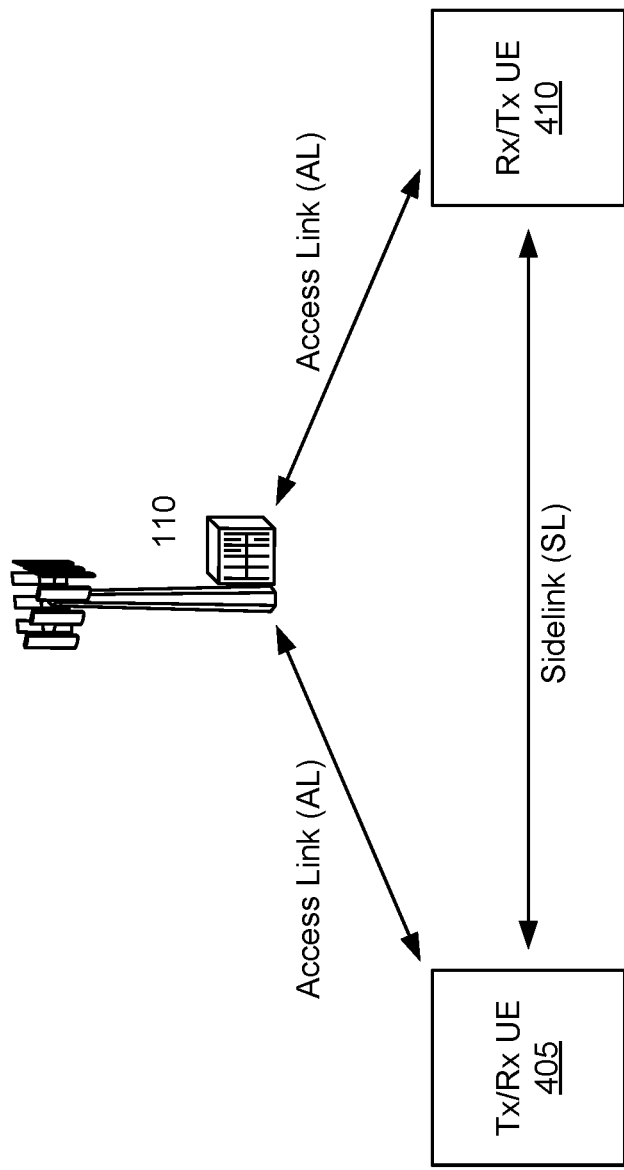
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

FIG. 5 is a diagram illustrating an example 500 of sidelink BWPs, in accordance with the present disclosure.

A UE may use a BWP as a part of available bandwidth to save power. The UE may be configured with multiple BWPs (e.g., maximum 4 BWPs per carrier for downlink and uplink, respectively), but only one BWP is active for downlink and only one BWP is active for uplink per carrier at a specific time. When a base station, such as a gNB, configures a BWP for the UE, the gNB may include parameters such as a BWP numerology (subcarrier spacing (SCS) and cyclic prefix type), a BWP bandwidth size, a frequency location, and a control resource set (CORESET). UEs are expected to receive and transmit only within the frequency range configured for the active BWPs, with the associated numerologies. However, there are exceptions. For example, the UE may perform radio resource management (RRM) measurements or transmit a sounding reference signal (SRS) in a measurement gap that is outside of the active BWP.

A gNB may activate, deactivate, or switch to a BWP with dedicated radio resource control (RRC) signaling (e.g., via RRC reconfiguration with different BWP(s)), a medium access control control element (MAC CE) (e.g., a MAC CE containing a BWP ID, a DCI 0_1 for uplink (e.g., a scheduling DCI indicating a BWP indicator), or a DCI 1_0 for downlink. The UE may also switch to a BWP based on a BWP inactivity timer (bwp-inactivityTimer). For example, the UE may switch to a default BWP when the BWP inactivity timer expires.

BWPs may also be used for sidelink (SL). However, only one BWP is configured and activated for all UEs on a sidelink carrier. Only one carrier is supported on sidelink for NR V2X (i.e., no multi-carrier support on sidelink).

In addition to sidelink BWPs, a UE may be configured for sidelink DRX. Sidelink DRX involves the UE sleeping (inactive state for off-duration) and waking (active state for on-duration) during a sidelink DRX cycle. A sidelink DRX configuration may be negotiated between paired UEs and configured per communication direction between the paired UEs using unicast. The sidelink DRX configuration may be determined by a transmitting UE for the traffic direction from the transmitting UE, with assistance information from a receiving UE. For unicast, the UE may support an on-duration timer, an inactivity timer, a HARQ round trip time (RTT) timer, and/or a HARQ retransmission timer.

Sidelink DRX may also be used for groupcast and configured per QoS and Layer 2 (L2) destination ID. For example, there may be a sidelink DRX cycle per QoS and a sidelink DRX offset per L2 destination ID. The on-duration timer, the inactivity timer, and the HARQ timers may be supported for groupcast.

Sidelink DRX may be used for broadcast. Sidelink DRX for broadcast may be configured per QoS and per L2 Destination ID (e.g., sidelink DRX cycle per QoS, sidelink DRX offset per L2 Destination ID). The on-duration timer may be supported.

Example 500 shows that a UE may be configured with multiple sidelink BWPs and multiple sidelink DRXs for multiple communications (e.g., unicast, groupcast or broadcast) of different services. For example, in scenarios 502, 504, 506, and 508 in example 500, SL BWP1 and SL DRX1 are for communication 1 of service 1, and SL BWP2 and SL DRX2 are for communication 2 of service 2.

If there is no overlapping between the active states of SL DRX1 and SL DRX2 (such as in scenarios 502 and 504), both the transmitting UE and the receiving UE are to switch their active sidelink BWPs in frequency according to the active states in time. If there is overlapping between the two active states in time (scenarios 506 and 508), both the transmitting UE and the receiving UE are to determine whether to switch their active sidelink BWPs during the overlapped active states, since the UEs can operate with only one active sidelink BWP at a time. Note that for sidelink, the scheduling SCI (e.g., SCI 1) is transmitted together with a data packet, which prohibits using scheduling SCI to dynamically indicate sidelink BWP switching. That is, if UEs are operating with multiple sidelink BWPs and sidelink DRXs for different services or communications, without cooperation, sidelink BWPs may overlap during active states and cause interference or other signal degradation, which wastes processing resources and signaling resources of the UEs.

As indicated above, FIG. 5 is provided as an example. Other examples may differ from what is described with regard to FIG. 5.

Figure 6:
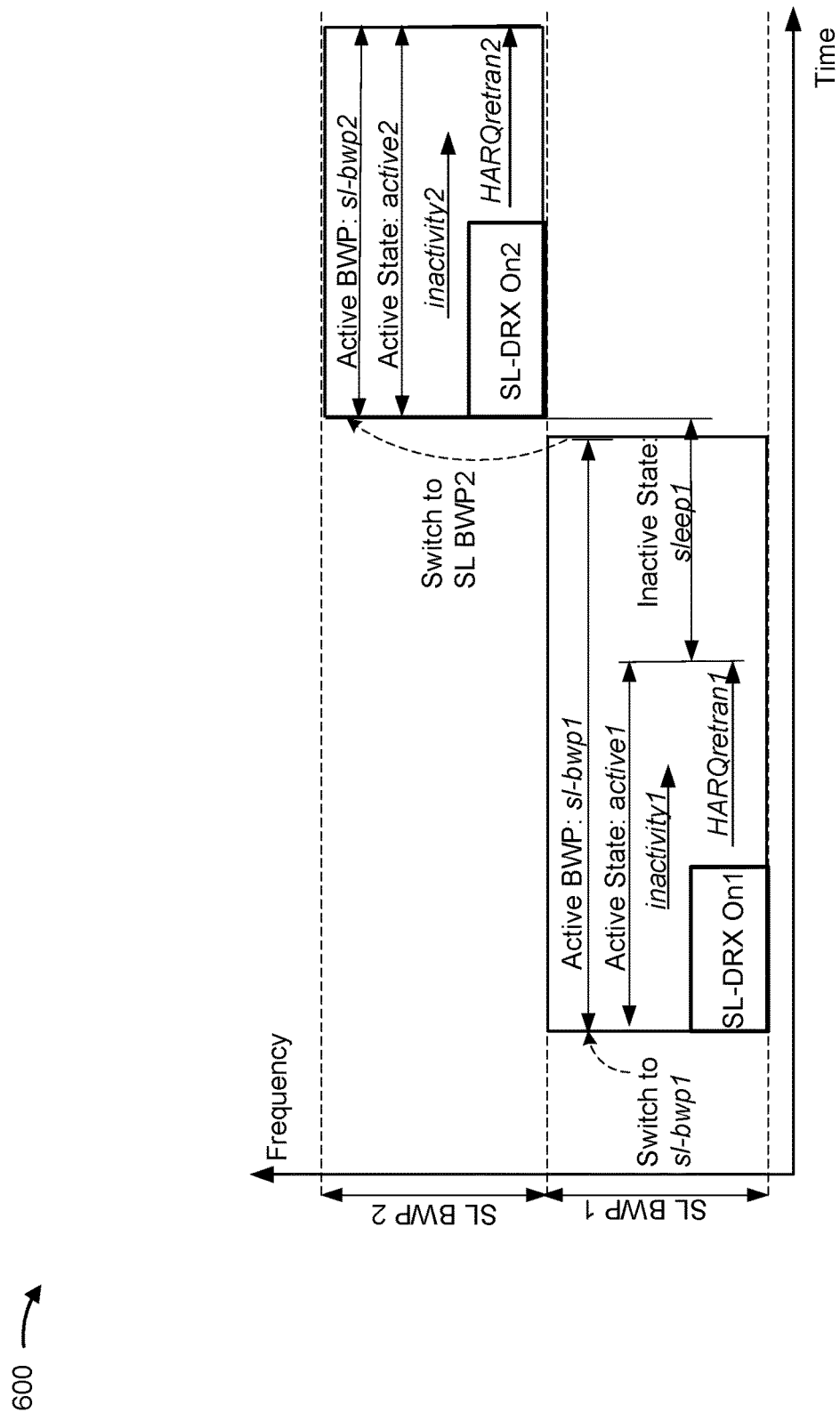
FIG. 6 is a diagram illustrating an example of a timeline for sidelink discontinuous reception, in accordance with the present disclosure.

FIG. 6 is a diagram illustrating an example 600 of a timeline for sidelink DRX, in accordance with the present disclosure. Example 600 shows different sidelink BWPs (e.g., SL BWP1 and SL BWP2) and different sidelink DRXs (e.g., SL DRX1 and SL DRX2) that are formed for communications (e.g., broadcasts, groupcasts or unicast) associated with various services on a sidelink carrier.

As shown in example 600, a UE may switch to an active sidelink BWP in frequency (sl-bwp1) to enter a sidelink DRX active state in time (active1) for an on-duration duration (SL-DRX On1) for sidelink communications of a service. The UE may stay in the active state (active1), which may be extended by a sidelink DRX inactivity timer (inactivity1) and/or a HARQ retransmission timer (HARQretran1). The UE may stay with its active sidelink BWP (sl-bwp1) even through its inactive state (sleep1) until switching to another active state (active2) in another sidelink BWP (sl-bwp2) for another sidelink DRX on-duration (SL-DRX On2) for sidelink communications of another service. However, maintaining an active sidelink BWP during an inactive state may unnecessarily consume extra power, especially when the active sidelink BWP is a wide frequency band.

As indicated above, FIG. 6 is provided as an example. Other examples may differ from what is described with regard to FIG. 6.

Figure 7:
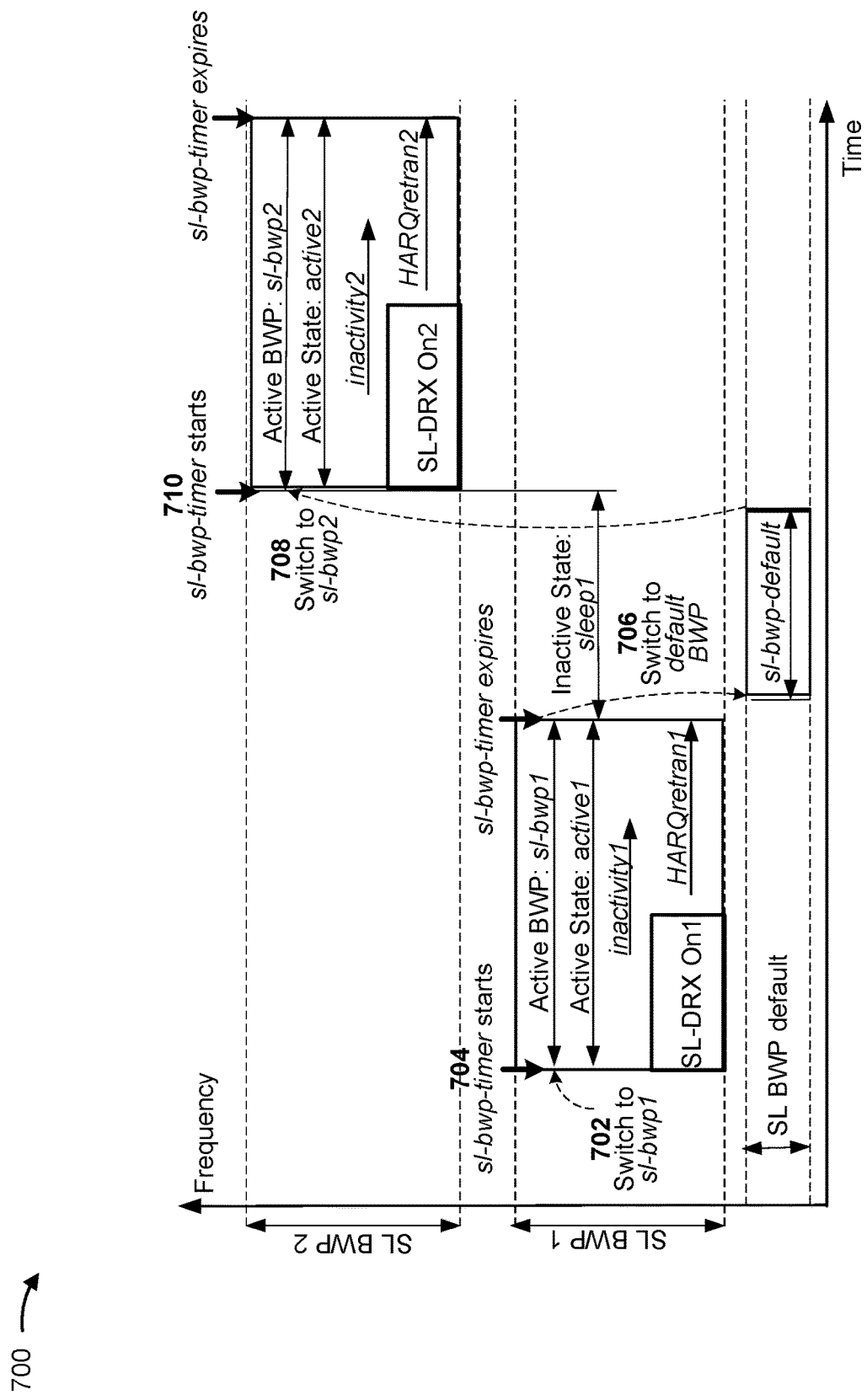
FIG. 7 is a diagram illustrating an example of using a sidelink BWP timer, in accordance with the present disclosure.

FIG. 7 is a diagram illustrating an example 700 of using a sidelink BWP timer, in accordance with the present disclosure.

According to various aspects described herein, a UE (e.g., a UE 120, UE 405) may save power during an inactive state by switching an active sidelink BWP based at least in part on an active state of the UE. For example, the UE may start a sidelink BWP timer with a duration that is based at least in part on a timing of a sidelink DRX active state of the UE. The timing may include an on-duration for the sidelink DRX active state. In some aspects, the sidelink BWP timer may be equal to or similar to the on-duration for the sidelink DRX active state.

The sidelink BWP timer may be based at least in part on information about a configuration of the sidelink BWP and a configuration of the sidelink DRX cycle. The UE may switch to a first sidelink BWP and remain in the first sidelink BWP during the time when sidelink BWP timer is running. When the sidelink BWP timer expires, the UE may leave the first sidelink BWP. The UE may switch to a second sidelink BWP, which may be a default BWP.

Example 700 shows a UE that may operate with two non-overlapping active states in time (e.g., active state of SL DRX 1 and active state of SL DRX2) with two different active sidelink BWPs in frequency, respectively. The UE may set its active sidelink BWP based at least in part on a timing of the sidelink DRX active state. That is, the UE may operate in a first sidelink BWP while in the active state (e.g., an active sidelink BWP for active state) and then switch to a second sidelink BWP (e.g., a sidelink BWP for inactive state), such as a default sidelink BWP (SL-BWP-default) with a narrow bandwidth or a sleep sidelink BWP (SL-BWP-sleep) with zero bandwidth.

For example, as shown by reference number 702, the UE may switch to a first sidelink BWP (e.g., sl-bwp1 for a first active state). As shown by reference number 704, the UE may start a sidelink BWP timer (sl-bwp-timer), where the sidelink BWP timer is set with a duration that is based on the sidelink DRX on-duration (SL-DRX On1) (e.g., equal or larger than the on-duration). The UE may extend the active state based at least in part on the inactivity timer or the HARQ retransmission timer. That is, the UE may extend the duration of the sidelink BWP timer when extending the active state in time. For example, the UE may extend a length of the duration of the sidelink BWP timer when the active state is extended via a sidelink DRX inactivity timer (inactivity1) or a HARQ retransmission timer (HARQretran1) (e.g., extend the sidelink BWP timer to an end of the sidelink DRX inactivity timer or an end of the HARQ retransmission timer), staying with the active sidelink BWP throughout the active state.

Upon expiration of the sidelink BWP timer, as shown by reference number 706, the UE may switch to a second sidelink BWP, such as a default sidelink BWP (sl-bwp-default), an initial sidelink BWP, or a common sidelink BWP with a narrow bandwidth (e.g., narrower than the bandwidth of the sidelink BWP for an active state). The second sidelink BWP may also be a "sleep" sidelink BWP with zero bandwidth. Switching to the second sidelink BWP may save the UE power during the inactive state (e.g., a narrow bandwidth sidelink BWP or a zero bandwidth sidelink BWP). By tying the duration of a sidelink BWP timer to the duration of the sidelink DRX active state, the UE may switch to a narrow bandwidth or zero bandwidth sidelink BWP sooner and conserve more power.

As shown by reference number 708, the UE may switch to another active BWP (sl-bwp2 for a second active state) when the sidelink BWP timer expires. As shown by reference number 710, the UE may start the sidelink BWP timer, where the duration of the sidelink BWP timer is set based on the other sidelink DRX on-duration (SL-DRX On2).

As indicated above, FIG. 7 is provided as an example. Other examples may differ from what is described with regard to FIG. 7.

Figure 8:
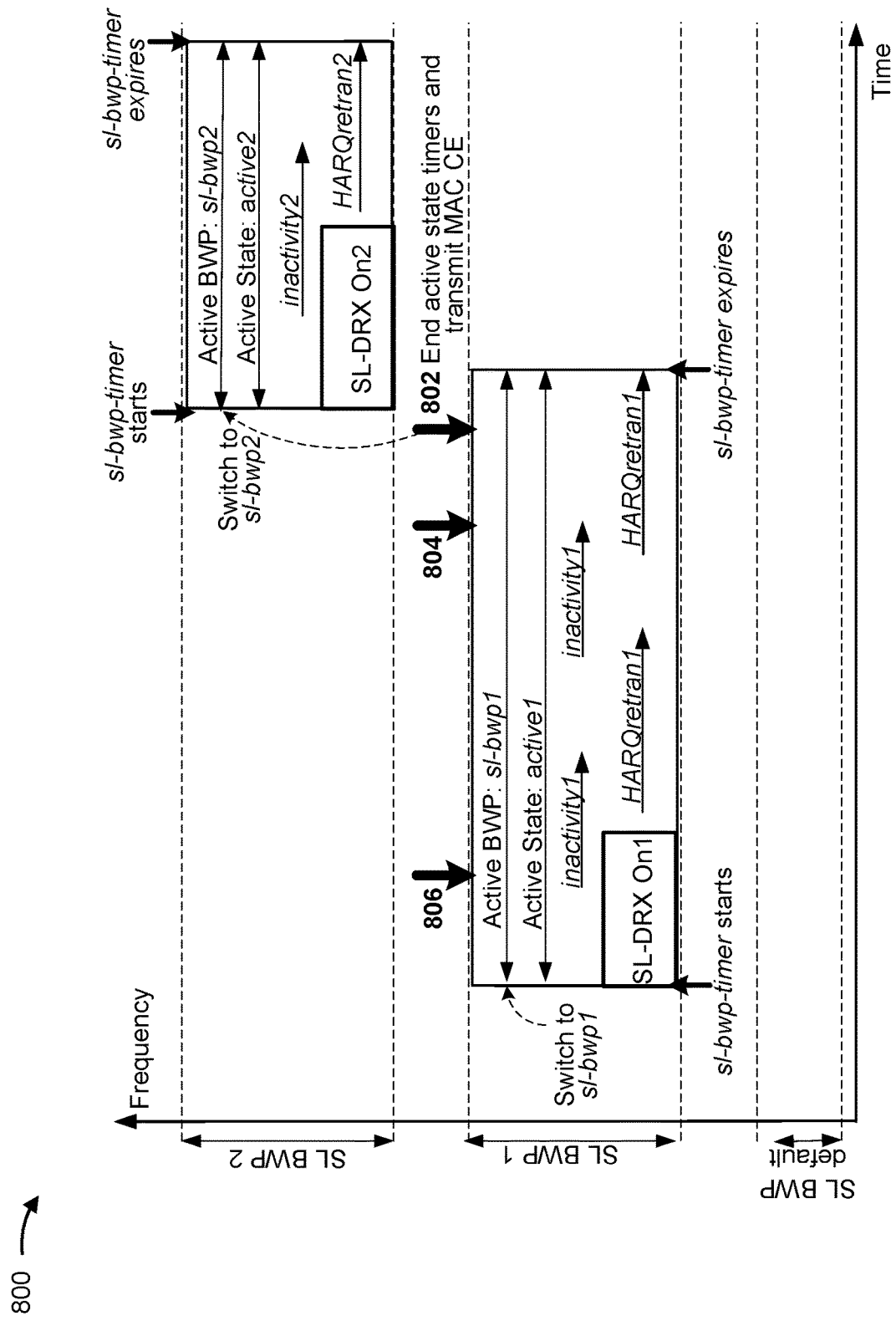
FIG. 8 is a diagram illustrating an example of ending timers and an active state, in accordance with the present disclosure.

FIG. 8 is a diagram illustrating an example 800 of ending timers and an active state, in accordance with the present disclosure. Example 800 shows a first UE (e.g., a UE 120, UE 405) that operates with two active states, such as an active state of SL DRX 1 (active1) and an active state of SL DRX2 (active2), that could overlap in different active sidelink BWPs.

As described in connection with FIG. 7, the first UE may extend the sidelink DRX active state based at least in part on the inactivity timer and/or the HARQ retransmission timer. The first UE may determine if the extended sidelink DRX active state is to overlap with the active state of another sidelink DRX. To avoid the overlap of the active states, the first UE may end its active state earlier than the expiration of the sidelink DRX timer and end its active sidelink BWP accordingly, as shown by reference number 802. The first UE may transmit an indication (e.g., a PC5 RRC message, a MAC CE command or an SCI) to a second UE (e.g., a UE 120, UE 410) that indicates that the second UE is to end all sidelink BWP and DRX timers and end the active state of the second UE.

In some aspects, the first UE may end the active state and the timers even earlier, as shown by reference number 804. For example, the first UE may end the active state during an inactivity timer running duration or at the end of an inactivity timer running duration and before the end of a HARQ retransmission timer running duration, even though the sidelink BWP timer was extended to the end of the HARQ retransmission timer. In some aspects, the first UE may end the active state early, as shown by reference number 806 (e.g., during the on-duration). By ending earlier, depending upon traffic conditions (e.g., transmitting no more data, or dropping or delaying lower priority, long latency or low reliability data transmissions with a congested channel) and a UE status (e.g., type of UE, power consumption of the UE, battery status of the UE), the first UE may conserve power and avoid overlap with another sidelink DRX active state in another sidelink BWP that could degrade communications. Avoiding degraded communications conserves processing resources and signaling resources.

As indicated above, FIG. 8 is provided as an example. Other examples may differ from what is described with regard to FIG. 8.

Figure 9:
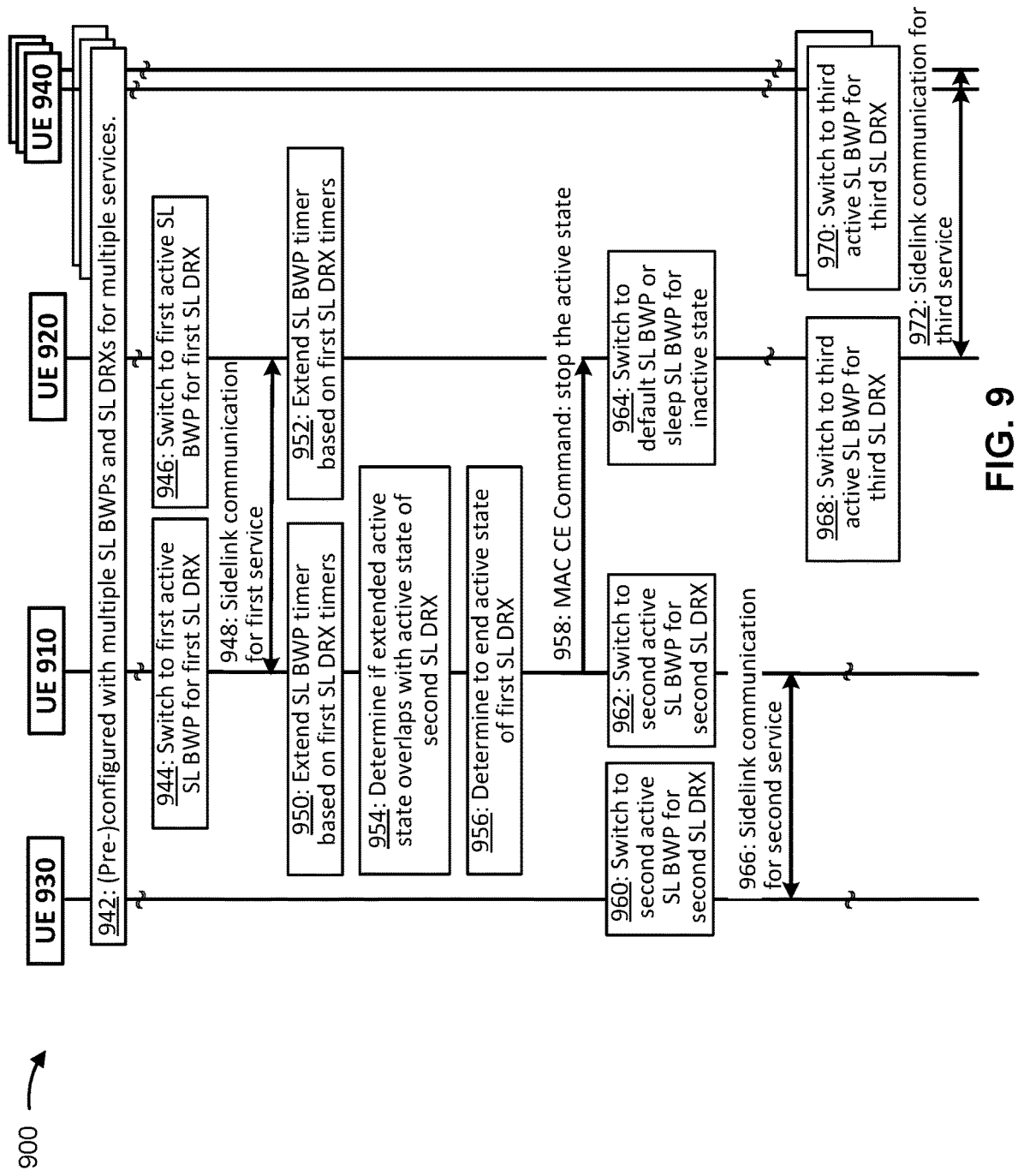
FIG. 9 is a diagram illustrating an example of a call flow for switching BWPs, in accordance with the present disclosure.

FIG. 9 is a diagram illustrating an example 900 of a call flow for switching BWPs, in accordance with the present disclosure. Example 900 shows UEs that may communicate with each other on a sidelink, including UE 910, UE 920, UE 930, and UEs 940.

As shown by reference number 942, the UEs may be configured (or preconfigured) with multiple sidelink BWPs (e.g., SL BWP1 and SL BWP2 shown in FIGS. 7 and 8) and sidelink DRXs (e.g., SL DRX1 and SL DRX2 shown in FIGS. 7 and 8) for multiple services (e.g., Service1, Service2), respectively.

As shown by reference number 944, UE 910 may switch to a first active sidelink BWP (e.g., SL BWP1 shown in FIGS. 7 and 8) for a first sidelink DRX (e.g., SL DRX1 shown in FIGS. 7 and 8) of a first service (Service1). UE 910 may start a sidelink BWP timer (e.g., sl-bwp-timer) that is set based at least in part on the on-duration (e.g., SL-DRX On1) of the SL DRX1 active state. As shown by reference number 946, UE 920 may likewise switch to the first active sidelink BWP1 for the first sidelink DRX and start the sidelink BWP timer that is set based at least in part on the on-duration of the SL DRX1 active state. As shown by reference number 948, UE 910 may transmit and receive sidelink communications with UE 920 during the active state with the sidelink BWP timer running.

As shown by reference numbers 950 and 952, UE 910 and UE 920 may extend the sidelink BWP timer based on a sidelink DRX inactivity timer (e.g., inactivity1 shown in FIGS. 7 and 8) and/or a HARQ retransmission timer (e.g., HARQretran1 shown in FIGS. 7 and 8), and operate with the active sidelink BWP during the extended first active state. As shown by reference number 954, UE 910 may determine if the extended first active state (e.g., active1 shown in FIGS. 7 and 8) overlaps with a second active state of a second SL DRX (e.g., active2). As shown by reference number 956, UE 910 may determine to end the extended first active state before the expiration of the sidelink DRX and BWP timers to avoid the overlapping of two active states with two active sidelink BWPs (e.g., overlapping of sl-bwp1 and sl-bwp2, shown in FIGS. 7 and 8). As shown by reference number 958, UE 910 may transmit an indication (e.g., a MAC CE command) to UE 920 to indicate the forced ending of the first active state and the ending of all running timers. UE 920 may end its timers and active state early based on the received indication.

As shown by reference numbers 960 and 962, UE 910 and UE 930 may switch to a second active sidelink BWP (e.g., sl-bwp2 shown in FIGS. 7 and 8) for a second sidelink DRX active state of a second service and start the sidelink BWP timer that is set based at least in part on the on-duration of the second sidelink DRX active state. As shown by reference number 964, UE 920 may switch to another sidelink BWP, such as default sidelink BWP (e.g., sl-bwp-default as shown in FIG. 3) or a sleep sidelink BWP for the inactive state to save power. As shown by reference number 966, UE 910 and UE 930 may communicate for the second service during the active state with the sidelink BWP timer running.

As shown by reference numbers 968 and 970, UE 920 and UEs 940 may switch to a third active sidelink BWP for a third sidelink DRX active state of a third service and start the sidelink BWP timer that is set based at least in part on the on-duration of the third sidelink DRX active state. As shown by reference number 972, UE 920 and UE 940s may communicate for the third service during the active state with the sidelink BWP timer running. The third service may involve a groupcast or broadcast for a service with the UEs 940.

As indicated above, FIG. 9 is provided as an example. Other examples may differ from what is described with regard to FIG. 9.

Figure 10:
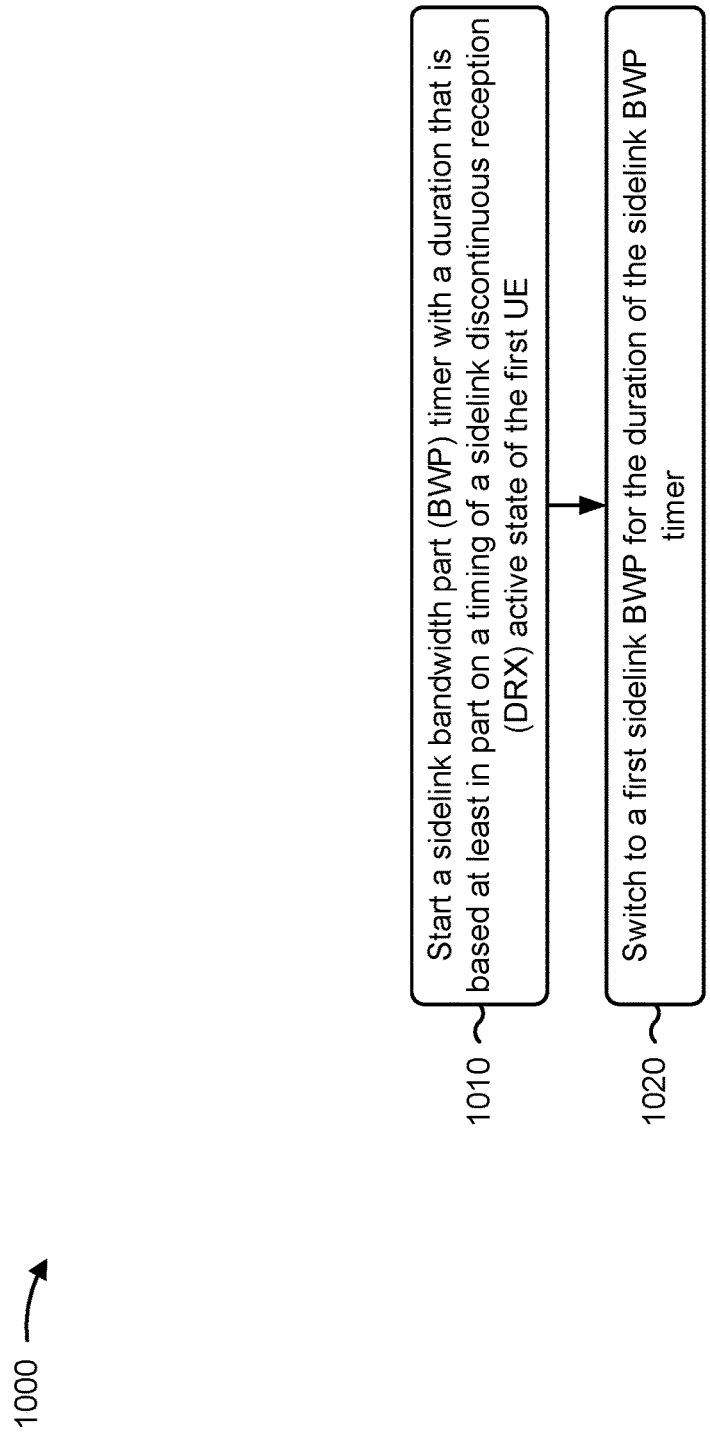
FIG. 10 is a diagram illustrating an example process performed, for example, by a first UE, in accordance with the present disclosure.

FIG. 10 is a diagram illustrating an example process 1000 performed, for example, by a first UE, in accordance with the present disclosure. Example process 1000 is an example where the first UE (e.g., a UE 120, UE 405) performs operations associated with a sidelink BWP timer that is based on an active state of the first UE.

As shown in FIG. 10, in some aspects, process 1000 may include starting a sidelink BWP timer with a duration that is based at least in part on a timing of a sidelink DRX active state of the first UE (block 1010). For example, the first UE (e.g., using communication manager 140 and/or timer component 1108 depicted in FIG. 11) may start a sidelink BWP timer with a duration that is based at least in part on a timing of a sidelink DRX active state of the first UE, as described above.

As further shown in FIG. 10, in some aspects, process 1000 may include switching to a first sidelink BWP for the duration of the sidelink BWP timer (block 1020). For example, the first UE (e.g., using communication manager 140 and/or BWP component 1110 depicted in FIG. 11) may switch to a first sidelink BWP for the duration of the sidelink BWP timer, as described above.

Process 1000 may include additional aspects, such as any single aspect or any combination of aspects described below and/or in connection with one or more other processes described elsewhere herein.

In a first aspect, process 1000 includes receiving information associated with a sidelink BWP configuration and a sidelink DRX configuration, where starting the timer includes starting the timer based at least in part on the information.

In a second aspect, alone or in combination with the first aspect, process 1000 includes setting the duration of the sidelink BWP timer based at least in part on an on-duration for the sidelink DRX active state. In a third aspect, alone or in combination with one or more of the first and second aspects, process 1000 includes extending the duration of the sidelink BWP timer based at least in part on one or more of a duration of a sidelink DRX inactivity timer or a duration of a HARQ retransmission timer.

In a fourth aspect, alone or in combination with one or more of the first through third aspects, process 1000 includes extending the sidelink DRX active state (or the on-duration for the sidelink DRX active state) based at least in part on one or more of the duration of the sidelink DRX inactivity timer or the duration of the HARQ retransmission timer.

In a fifth aspect, alone or in combination with one or more of the first through fourth aspects, process 1000 includes switching to a second sidelink BWP (e.g., default BWP) upon expiration of the sidelink BWP timer. In a sixth aspect, alone or in combination with one or more of the first through fifth aspects, the second sidelink BWP includes a bandwidth that is narrower than bandwidths of available sidelink BWPs. In a seventh aspect, alone or in combination with one or more of the first through sixth aspects, the second sidelink BWP includes a sleep sidelink BWP with zero bandwidth.

In an eighth aspect, alone or in combination with one or more of the first through seventh aspects, process 1000 includes ending the sidelink BWP timer before the sidelink BWP timer expires, and transmitting, to a second UE, an indication (e.g., MAC CE) that indicates that a sidelink BWP timer of the second UE is to end before the sidelink BWP timer of the second UE expires.

In a ninth aspect, alone or in combination with one or more of the first through eighth aspects, process 1000 includes ending the sidelink DRX active state of the first UE before a scheduled end of the sidelink DRX active state (e.g., based at least in part on one or more of an on duration timer, an inactivity timer, or a hybrid automatic repeat request retransmission timer), where the indication indicates that a sidelink DRX active state of the second UE is to end before a scheduled end (end of configured on-duration) of the sidelink DRX active state of the second UE.

In a tenth aspect, alone or in combination with one or more of the first through ninth aspects, process 1000 includes receiving, from a second UE, an indication (e.g., MAC CE) that indicates that the sidelink BWP timer is to end before the sidelink BWP timer expires, and ending the sidelink BWP timer before the sidelink BWP timer expires.

In an eleventh aspect, alone or in combination with one or more of the first through tenth aspects, the indication indicates that the sidelink DRX active state of the first UE is to end before a scheduled end (end of configured on-duration) of the sidelink DRX active state of the first UE based at least in part on one or more of an on duration timer, an inactivity timer, or a hybrid automatic repeat request retransmission timer, and process 1000 includes ending the sidelink DRX active state of the first UE before the scheduled end of the sidelink DRX active state of the first UE.

In a twelfth aspect, alone or in combination with one or more of the first through eleventh aspects, the sidelink BWP timer is associated with a groupcast or broadcast sidelink service.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
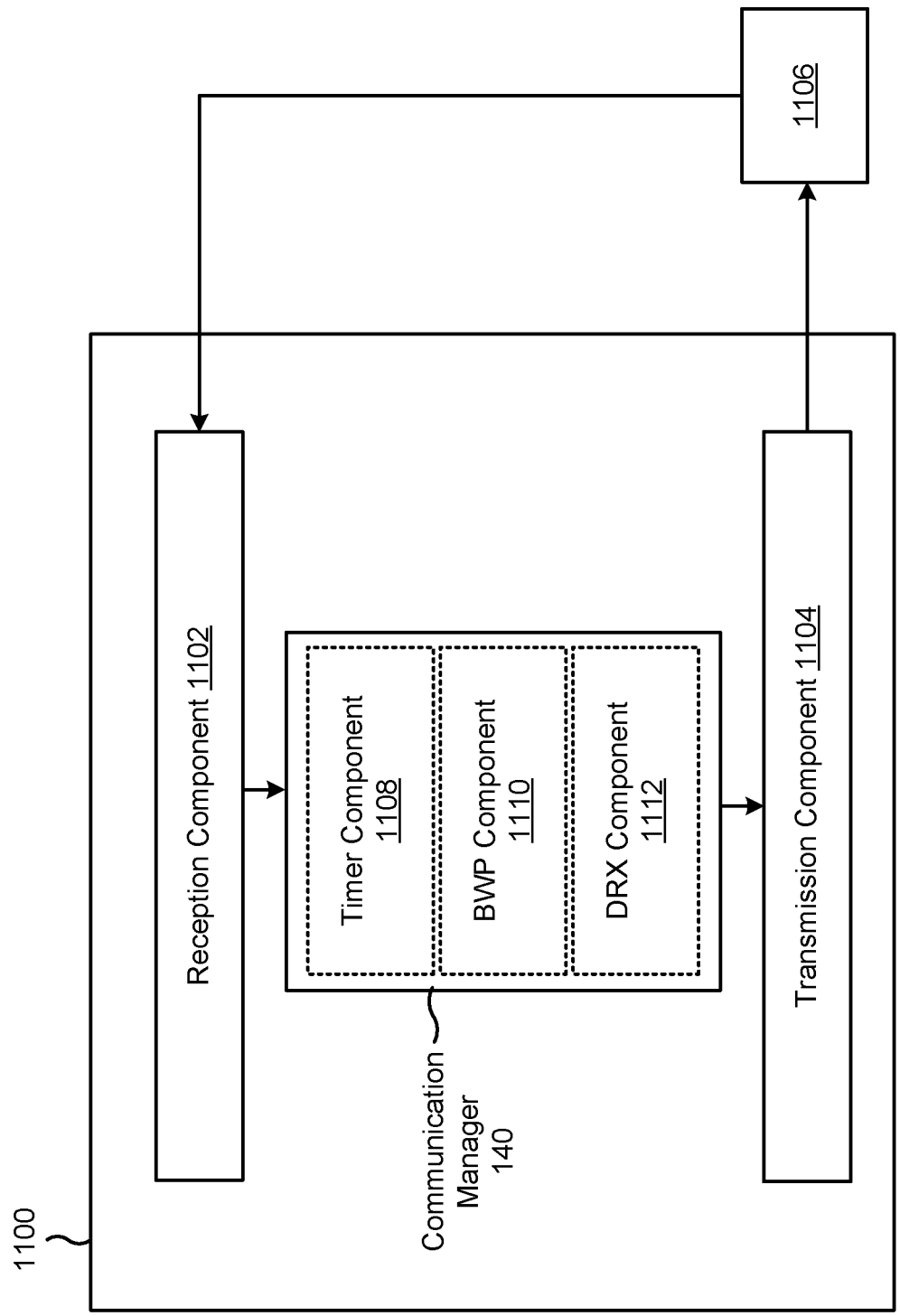
FIG. 11 is a diagram of an example apparatus for wireless communication, in accordance with the present disclosure.

FIG. 11 is a diagram of an example apparatus 1100 for wireless communication. The apparatus 1100 may be a first UE (e.g., UE 120), or a first UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include a timer component 1108, a BWP component 1110, and/or a DRX component 1112, among other examples.

In some aspects, the apparatus 1100 may be configured to perform one or more operations described herein in connection with FIGS. 1-9. Additionally, or alternatively, the apparatus 1100 may be configured to perform one or more processes described herein, such as process 1000 of FIG. 10. In some aspects, the apparatus 1100 and/or one or more components shown in FIG. 11 may include one or more components of the first UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the first UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the first UE described in connection with FIG. 2. In some aspects, the transmission component 1104 may be co-located with the reception component 1102 in a transceiver.

The timer component 1108 may start a sidelink BWP timer with a duration that is based at least in part on a timing of a sidelink DRX active state of the first UE. The BWP component 1110 may switch to a first sidelink BWP for the duration of the sidelink BWP timer. The reception component 1102 may receive information associated with a sidelink BWP configuration and a sidelink DRX configuration, where starting the timer includes starting the timer based at least in part on the information.

The timer component 1108 may set the duration of the sidelink BWP timer based at least in part on an on-duration for the sidelink DRX active state. The timer component 1108 may extend the duration of the sidelink BWP timer based at least in part on one or more of a duration of a sidelink DRX inactivity timer or a duration of a HARQ retransmission timer. The timer component 1108 may extend the on-duration for the sidelink DRX active state based at least in part on one or more of the duration of the sidelink DRX inactivity timer or the duration of the HARQ retransmission timer. The BWP component 1110 may switch to a default BWP upon expiration of the sidelink BWP timer.

The timer component 1108 may end the sidelink BWP timer before the sidelink BWP timer expires. The transmission component 1104 may transmit, to a second UE, an indication (e.g., MAC CE) that indicates that a sidelink BWP timer of the second UE is to end before the sidelink BWP timer of the second UE expires.

The DRX component 1112 may end the sidelink DRX active state of the first UE before a scheduled end (end of configured on-duration) for the sidelink DRX active state, where the indication indicates that a sidelink DRX active state of the second UE is to end before a scheduled end (end of configured on-duration) for the sidelink DRX active state of the second UE.

The reception component 1102 may receive, from a second UE, a MAC CE that indicates that the sidelink BWP timer is to end before the sidelink BWP timer expires. The timer component 1108 may end the sidelink BWP timer before the sidelink BWP timer expires.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a first user equipment (UE), comprising: starting a sidelink bandwidth part (BWP) timer with a duration that is based at least in part on a timing of a sidelink discontinuous reception (DRX) active state of the first UE; and switching to a first sidelink BWP for the duration of the sidelink BWP timer.

Aspect 2: The method of Aspect 1, further comprising receiving information associated with a sidelink BWP configuration and a sidelink DRX configuration, wherein starting the timer includes starting the timer based at least in part on the information.

Aspect 3: The method of Aspect 1 or 2, further comprising setting the duration of the sidelink BWP timer based at least in part on an on duration for the sidelink DRX active state.

Aspect 4: The method of Aspect 3, further comprising extending the duration of the sidelink BWP timer based at least in part on one or more of a duration of a sidelink DRX inactivity timer or a duration of a hybrid automatic repeat request (HARQ) retransmission timer.

Aspect 5: The method of Aspect 4, further comprising extending the sidelink DRX active state based at least in part on one or more of the duration of the sidelink DRX inactivity timer or the duration of the HARQ retransmission timer.

Aspect 6: The method of any of Aspects 1-5, further comprising switching to a second sidelink BWP upon expiration of the sidelink BWP timer.

Aspect 7: The method of Aspect 6, wherein the second sidelink BWP includes a bandwidth that is narrower than bandwidths of available sidelink BWPs.

Aspect 8: The method of Aspect 6, wherein the second sidelink BWP includes a sleep sidelink BWP with zero bandwidth.

Aspect 9: The method of any of Aspects 1-8, further comprising: ending the sidelink BWP timer before the sidelink BWP timer expires; and transmitting, to a second UE, an indication that indicates that a sidelink BWP timer of the second UE is to end before the sidelink BWP timer of the second UE expires.

Aspect 10: The method of Aspect 9, further comprising ending the sidelink DRX active state of the first UE before a scheduled end of the sidelink DRX active state based at least in part on one or more of an on duration timer, an inactivity timer, or a hybrid automatic repeat request retransmission timer, wherein the indication indicates that a sidelink DRX active state of the second UE is to end before a scheduled end of the sidelink DRX active state of the second UE.

Aspect 11: The method of Aspect 9, wherein the indication includes a medium access control control element (MAC CE).

Aspect 12: The method of any of Aspects 1-11, further comprising: receiving, from a second UE, an indication that indicates that the sidelink BWP timer is to end before the sidelink BWP timer expires; and ending the sidelink BWP timer before the sidelink BWP timer expires.

Aspect 13: The method of Aspect 12, wherein the indication indicates that the sidelink DRX active state of the first UE is to end before a scheduled end of the sidelink DRX active state of the first UE based at least in part on one or more of an on duration timer, an inactivity timer, or a hybrid automatic repeat request retransmission timer, and wherein the method further comprises ending the sidelink DRX active state of the first UE before the scheduled end of the sidelink DRX active state of the first UE.

Aspect 14: The method of any of Aspects 1-13, wherein the sidelink BWP timer is associated with a groupcast or broadcast sidelink service.

Aspect 15: An apparatus for wireless communication at a device, comprising a processor; memory coupled with the processor; and instructions stored in the memory and executable by the processor to cause the apparatus to perform the method of one or more of Aspects 1-14.

Aspect 16: A device for wireless communication, comprising a memory and one or more processors coupled to the memory, the one or more processors configured to perform the method of one or more of Aspects 1-14.

Aspect 17: An apparatus for wireless communication, comprising at least one means for performing the method of one or more of Aspects 1-14.

Aspect 18: A non-transitory computer-readable medium storing code for wireless communication, the code comprising instructions executable by a processor to perform the method of one or more of Aspects 1-14.

Aspect 19: A non-transitory computer-readable medium storing a set of instructions for wireless communication, the set of instructions comprising one or more instructions that, when executed by one or more processors of a device, cause the device to perform the method of one or more of Aspects 1-14.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first user equipment (UE), comprising:
   receiving information associated with a sidelink bandwidth part (BWP) configuration and a sidelink discontinuous reception (DRX) configuration;
   starting a sidelink BWP timer based at least in part on the information, wherein a duration of the sidelink BWP timer is based at least in part on a timing of a sidelink DRX active state of the first UE;
   switching to a first sidelink BWP for the duration of the sidelink BWP timer; and
   switching from the first sidelink BWP to a second sidelink BWP upon expiration of the sidelink BWP timer,
   wherein the second sidelink BWP includes a sleep sidelink BWP with zero bandwidth.

2. The method of claim 1, further comprising setting the duration of the sidelink BWP timer based at least in part on an on duration for the sidelink DRX active state.

3. The method of claim 2, further comprising extending the duration of the sidelink BWP timer based at least in part on one or more of a duration of a sidelink DRX inactivity timer or a duration of a hybrid automatic repeat request (HARQ) retransmission timer.

4. The method of claim 3, further comprising extending the sidelink DRX active state based at least in part on one or more of the duration of the sidelink DRX inactivity timer or the duration of the HARQ retransmission timer.

5. The method of claim 1, further comprising:
ending the sidelink BWP timer before the sidelink BWP timer expires; and
transmitting, to a second UE, an indication that indicates that a sidelink BWP timer of the second UE is to end before the sidelink BWP timer of the second UE expires.

6. The method of claim 5, further comprising ending the sidelink DRX active state of the first UE before a scheduled end of the sidelink DRX active state based at least in part on one or more of an on duration timer, an inactivity timer, or a hybrid automatic repeat request retransmission timer, wherein the indication indicates that a sidelink DRX active state of the second UE is to end before a scheduled end of the sidelink DRX active state of the second UE.

7. The method of claim 5, wherein the indication includes a medium access control control element (MAC CE).

8. The method of claim 1, further comprising:
receiving, from a second UE, an indication that indicates that the sidelink BWP timer is to end before the sidelink BWP timer expires; and
ending the sidelink BWP timer before the sidelink BWP timer expires.

9. The method of claim 8, wherein the indication indicates that the sidelink DRX active state of the first UE is to end before a scheduled end of the sidelink DRX active state of the first UE based at least in part on one or more of an on duration timer, an inactivity timer, or a hybrid automatic repeat request retransmission timer, and wherein the method further comprises ending the sidelink DRX active state of the first UE before the scheduled end of the sidelink DRX active state of the first UE.

10. The method of claim 1, wherein the sidelink BWP timer is associated with a groupcast or broadcast sidelink service.

11. The method of claim 1, wherein the sidelink DRX configuration is determined by the first UE based at least in part on assistance information from a second UE for a traffic direction from the first UE.

12. A first user equipment (UE) for wireless communication, comprising:
one or more memories; and
one or more processors, coupled to the one or more memories, configured to:
receive information associated with a sidelink bandwidth part (BWP) configuration and a sidelink discontinuous reception (DRX) configuration;
start a sidelink BWP timer based at least in part on the information, wherein a duration of the sidelink BWP timer is based at least in part on a timing of a sidelink DRX active state of the first UE;
switch to a first sidelink BWP for the duration of the sidelink BWP timer; and
switch from the first sidelink BWP to a second sidelink BWP upon expiration of the sidelink BWP timer, wherein the second sidelink BWP includes a sleep sidelink BWP with zero bandwidth.

13. The first UE of claim 12, wherein the one or more processors are configured to set the duration of the sidelink BWP timer based at least in part on an on duration for the sidelink DRX active state.

14. The first UE of claim 13, wherein the one or more processors are configured to extend the duration of the sidelink BWP timer based at least in part on one or more of a duration of a sidelink DRX inactivity timer or a duration of a hybrid automatic repeat request retransmission timer.

15. The first UE of claim 14, wherein the one or more processors are configured to extend the sidelink DRX active state based at least in part on one or more of the duration of the sidelink DRX inactivity timer or the duration of the hybrid automatic repeat request retransmission timer.

16. The first UE of claim 12, wherein the one or more processors are configured to:
end the sidelink BWP timer before the sidelink BWP timer expires; and
transmit, to a second UE, an indication that indicates that a sidelink BWP timer of the second UE is to end before the sidelink BWP timer of the second UE expires.

17. The first UE of claim 16, wherein the one or more processors are configured to end the sidelink DRX active state of the first UE before a scheduled end of the sidelink DRX active state based at least in part on one or more of an on duration timer, an inactivity timer, or a hybrid automatic repeat request retransmission timer, and wherein the indication indicates that a sidelink DRX active state of the second UE is to end before a scheduled end of the sidelink DRX active state of the second UE.

18. The first UE of claim 17, wherein the indication comprises a medium access control control element (MAC CE).

19. The first UE of claim 12, wherein the one or more processors are configured to:
receive, from a second UE, an indication that indicates that the sidelink BWP timer is to end before the sidelink BWP timer expires; and
end the sidelink BWP timer before the sidelink BWP timer expires.

20. The first UE of claim 19, wherein the indication indicates that the sidelink DRX active state of the first UE is to end before a scheduled end of the sidelink DRX active state of the first UE based at least in part on one or more of an on duration timer, an inactivity timer, or a hybrid automatic repeat request retransmission timer, and wherein the one or more processors are configured to end the sidelink DRX active state of the first UE before the scheduled end of the sidelink DRX active state of the first UE.

21. The first UE of claim 12, wherein the sidelink BWP timer is associated with a groupcast or broadcast sidelink service.

22. The first UE of claim 12, wherein the sidelink DRX configuration is determined by the first UE based at least in part on assistance information from a second UE for a traffic direction from the first UE.

23. A non-transitory computer-readable medium storing a set of instructions for wireless communication, the set of instructions comprising:
one or more instructions that, when executed by one or more processors of a first user equipment (UE), cause the first UE to:
receive information associated with a sidelink bandwidth part (BWP) configuration and a sidelink discontinuous reception (DRX) configuration;
start a sidelink BWP timer based at least in part on the information, wherein a duration of the sidelink BWP timer is based at least in part on a timing of a sidelink DRX active state of the first UE;
switch to a first sidelink BWP for the duration of the sidelink BWP timer; and switch from the first sidelink BWP to a second sidelink BWP upon expiration of the sidelink BWP timer, wherein the second sidelink BWP includes a sleep sidelink BWP with zero bandwidth.

24. The non-transitory computer-readable medium of claim 23, wherein the sidelink BWP timer is associated with a groupcast or broadcast sidelink service.

25. The non-transitory computer-readable medium of claim 23, wherein the sidelink DRX configuration is determined by the first UE based at least in part on assistance information from a second UE for a traffic direction from the first UE.

26. An apparatus for wireless communication, comprising:
   means for receiving information associated with a sidelink bandwidth part (BWP) configuration and a sidelink discontinuous reception (DRX) configuration;
   means for starting a sidelink BWP timer based at least in part on the information, wherein a duration of the sidelink BWP timer is based at least in part on a timing of a sidelink DRX active state of the apparatus; and
   means for switching to a first sidelink BWP for the duration of the sidelink BWP timer; and
   means for switching from the first sidelink BWP to a second sidelink BWP upon expiration of the sidelink BWP timer, wherein the second sidelink BWP includes a sleep sidelink BWP with zero bandwidth.

27. The apparatus of claim 26, wherein the sidelink BWP timer is associated with a groupcast or broadcast sidelink service.

28. The apparatus of claim 26, wherein the sidelink DRX configuration is determined by the apparatus based at least in part on assistance information from a user equipment (UE) for a traffic direction from the apparatus.

29. The apparatus of claim 26, further comprising means for extending the sidelink DRX active state based at least in part on one or more of a duration of a sidelink DRX inactivity timer or a duration of a hybrid automatic repeat request (HARQ) retransmission timer.

30. The apparatus of claim 26, further comprising means for ending the sidelink DRX active state of the apparatus before a scheduled end of the sidelink DRX active state based at least in part on a hybrid automatic repeat request (HARQ) retransmission timer.

* * * * *